United States Patent [19]
Fereidooni

[11] Patent Number: 6,061,181
[45] Date of Patent: May 9, 2000

[54] NONTRACKING LIGHT CONVERGER

[76] Inventor: Fred Fereidooni, P.O. Box 52085, New Orleans, La. 70152

[21] Appl. No.: 09/184,936

[22] Filed: Nov. 2, 1998

Related U.S. Application Data

[63] Continuation-in-part of application No. 08/871,660, Jun. 9, 1997, abandoned.

[51] Int. Cl.[7] .................................................. G02B 27/10
[52] U.S. Cl. .......................... 359/625; 126/683; 126/684
[58] Field of Search .................................... 126/683, 684, 126/685, 686, 687, 688, 689, 690, 691, 692, 693, 694, 695, 696, 697, 698, 699; 359/625

[56] References Cited

U.S. PATENT DOCUMENTS

| | | | |
|---|---|---|---|
| 2,496,681 | 2/1950 | Stephens | 359/665 |
| 4,249,516 | 2/1981 | Stark | 126/439 |
| 4,394,859 | 7/1983 | Drost | 126/438 |
| 4,719,904 | 1/1988 | O'Neill | 126/440 |
| 4,723,535 | 2/1988 | Lew | 126/439 |
| 5,727,585 | 3/1998 | Daume et al. | 126/652 |

*Primary Examiner*—Georgia Epps
*Assistant Examiner*—Tim Thompson
*Attorney, Agent, or Firm*—Kenneth L Tolar

[57] ABSTRACT

A light refracting and collecting assembly includes a housing having a bottom surface with two diverging side walls extending therefrom, two opposing end walls and an open top. Disposed between the side walls, proximal the bottom surface, is a light absorbing means such as a heat conductive conduit or a photovoltaic cell collector plate. Angularly extending from the upper surface of the light absorbing means are a plurality of substantially triangular prisms for refracting and directing light from the open top of the housing downwardly towards the light absorbing means. The interior surface of the side walls and bottom surface are coated with a light reflecting material to further direct light toward the light refracting prisms and the light absorbing means. A transparent cover member is superimposed on the open top for protecting the interior and to bend light towards the light absorbing means. The device is designed to increase the intensity of light contacting the collector plates to minimize the size of conventional collector plates and whereby the duration of usable sunlight is extended.

18 Claims, 6 Drawing Sheets

6,061,181

NONTRACKING LIGHT CONVERGER

This application is a continuation in part of application Ser. No. 08/871,660 filed on Jun. 9, 1997 now abandoned.

BACKGROUND OF THE INVENTION

The present invention relates to a light refracting and collecting system for directing light towards a light absorbing means to increase the efficiency of a solar powered or heated device.

DESCRIPTION OF THE PRIOR ART

Conventional solar powered devices include a photovoltaic cell having a collector plate that produces an electrical current upon being exposed to light. However, the intensity of light contacting the plate decreases when the light is being projected at an angle, as is the case in the late afternoon or early morning, Accordingly, the efficiency of the solar powered device is cyclical throughout the day sometimes requiring the collector plates to be repositioned as the angle of the sun changes. In addition, certain devices rely upon light to heat fluids within a conduit, pipe or similar means. Such devices are susceptible to the problems described above and therefore require the conduits, with collector plates attached thereto, to be repositioned as the angle of the sun changes. Furthermore, most solar collectors are not practical for refrigeration applications due to the high temperture that must be attained. The present invention provides a plurality of angularly disposed prism for directing light towards an attached collector plate. The device is designed to increase the intensity of light contacting the collector plate that would ordinarily have a lower intensity and temperature. Accordingly, the duration of usable sunlight is significantly extended. In addition, the device makes solar refrigeration more practical.

SUMMARY OF THE INVENTION

The present invention relates to a light refracting and collecting system for solar powered or heated devices comprising a housing having a bottom surface with upwardly diverging side walls and an open top. A light absorbing means such as a photovoltaic cell, collector plate or a heat conductive conduit is disposed within the housing. Angularly extending from the upper surface of the absorbing means are a plurality of prisms for refracting light towards the center of the housing. The interior surface of both the housing side walls and the bottom surface is coated with a light reflective material to reflect light towards the prisms. Alternative embodiments relate to variably configured and spaced prisms to increase the light collection efficiency for a predetermined range of sunlight as well as embodiments in which the light absorbing means is a centrally disposed conduit, a collector plate or combination of the two. It is therefore an object of the present invention to provide a light collection assembly that increases the efficiency of solar powered and heated devices.

It is yet another object of the present invention to provide a light collection assembly that reduces the size of a light absorbing means necessary to operate a given solar powered or heated device.

It is yet another object of the present invention to provide a light collection assembly that is easy to use and inexpensive to manufacture.

Other objects, features and advantages of the present invention will become readily apparent from the following detailed description of the preferred embodiment when considered with the attached drawings and the appended claims.

DESCRIPTION OF THE PREFERRED EMBODIMENT

Figure 2:
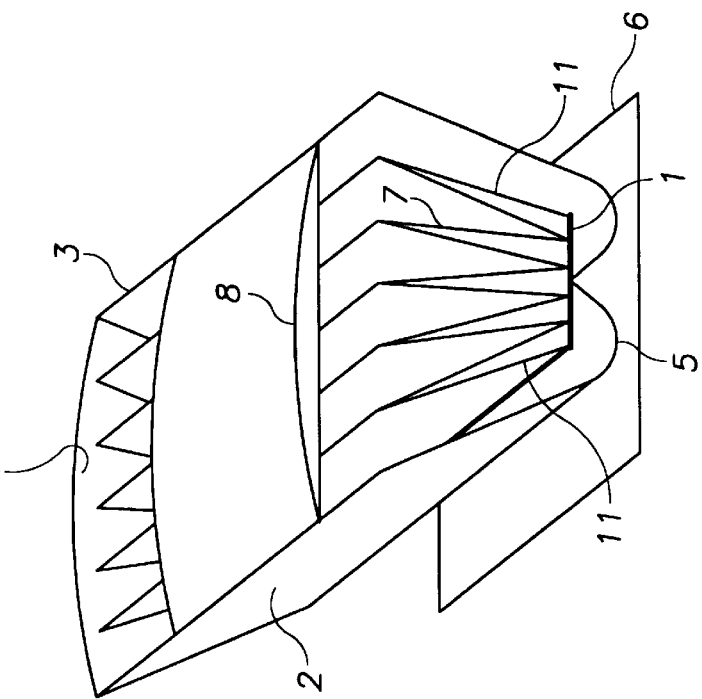
FIG. 2 is a perspective view of a device depicted in FIG. 1.
Figure 1:
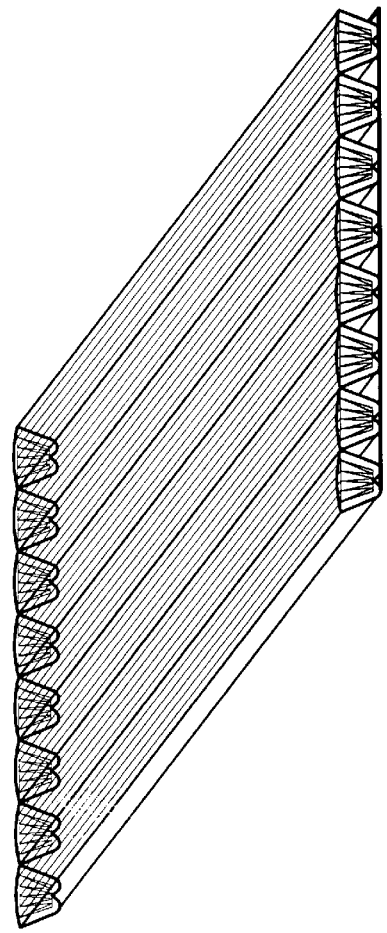
FIG. 1 depicts a system formed of a plurality of juxtaposed devices according to the present invention.
Figure 3:
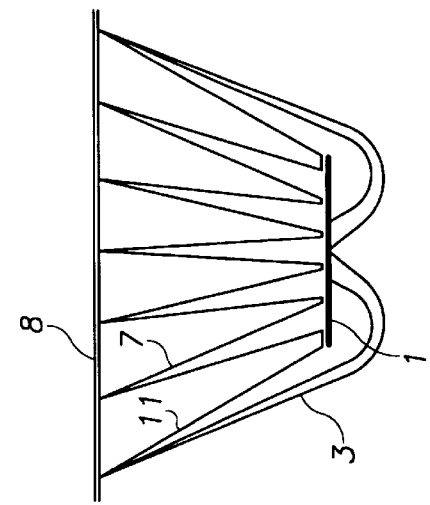
FIG. 3 is a cross-sectional view of the device pictured in FIG. 2 further including a combination collector plate and heat conductive conduit.
Figure 4:
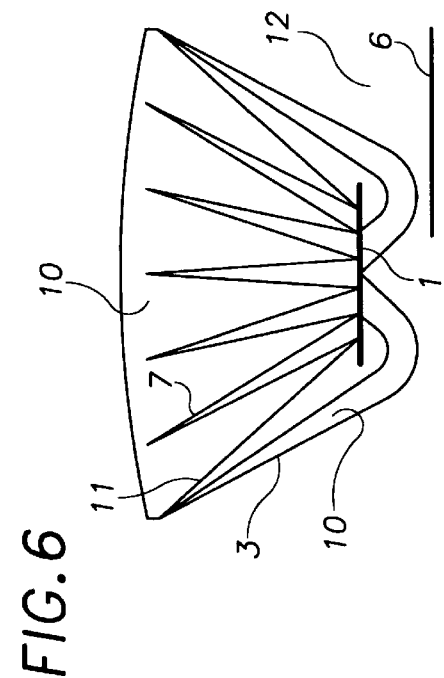
FIG. 4 is a cross-sectional view of a second embodiment in which a collector plate is embedded within the prisms and includes a planar cover member.
Figure 5:
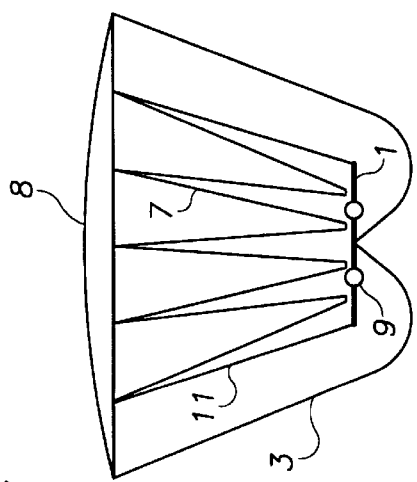
FIG. 5 is yet another embodiment according to the present invention in which a collector plate is completely embedded within the prisms.

Referring now to FIGS. 1–2, the present invention relates to a device for refracting and directing light rays to a solar powered or heated device. A solar powered device typically includes a photovoltaic cell that converts the energy generated by light to electricity. The cell includes a collector plate 1 that is exposed to the radiation to absorb the light. The present invention is designed to increase the amount of light that is absorbed by a predetermined area of the collector plate. The device comprises a hollow housing 2 having a bottom surface with a pair of opposing, diverging side walls 3 extending therefrom, two opposing end walls 4, an open top and an interior portion. The interior surface of the side walls, bottom surface and end walls are coated with a reflective material, such as a mirror or chrome, to reflect light towards the center of the housing interior. The housing may be supported by a base plate 6.

The bottom surface is formed of one or more juxtaposed, arcuate portions 5 which are also coated with a reflective material to reflect light towards the bottom surface of a light absorbing means. The absorbing means, such as a photovoltaic cell collector plate 1, is received within the interior portion of the housing proximal the bottom surface. Angularly extending from the upper surface of the absorbing means are a plurality of prisms 7 each having a substantially triangular cross-sectional configuration. The radially extending prisms refract light downwardly, towards the center of the housing and ultimately toward the collector plate. Light passing through two opposing outer prisms 11 is reflected back towards the center of the housing by the reflective side walls.

A transparent cover member 8 may be disposed on the top edges of the prisms to enclose the open top end. The cover member 8 has a convex or polygonal upper surface that initially bends light rays passing therethrough towards the center of the housing whereby the prisms may further direct it towards the absorbing means. For clarity, only a section of the cover member is depicted in FIG. 1. However, the cover member extends from one end wall to the opposing end wall.

Figure 6:
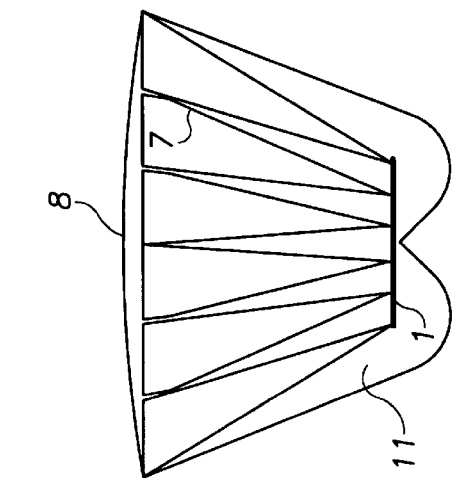
FIG. 6 is yet another embodiment according to the present invention in which a filler is disposed between the prisms.
Figure 17:
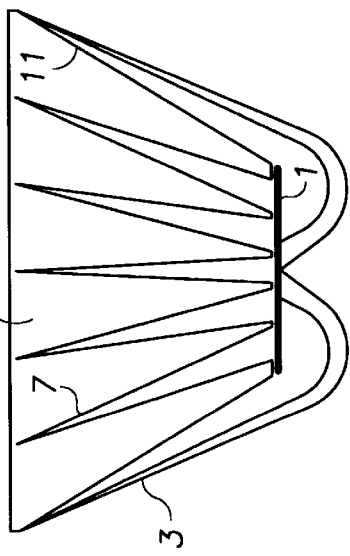
FIGS. 17 depicts an embodiment similar to that in FIG. 6 further including filler material that forms a flat top surface.
Figure 19:
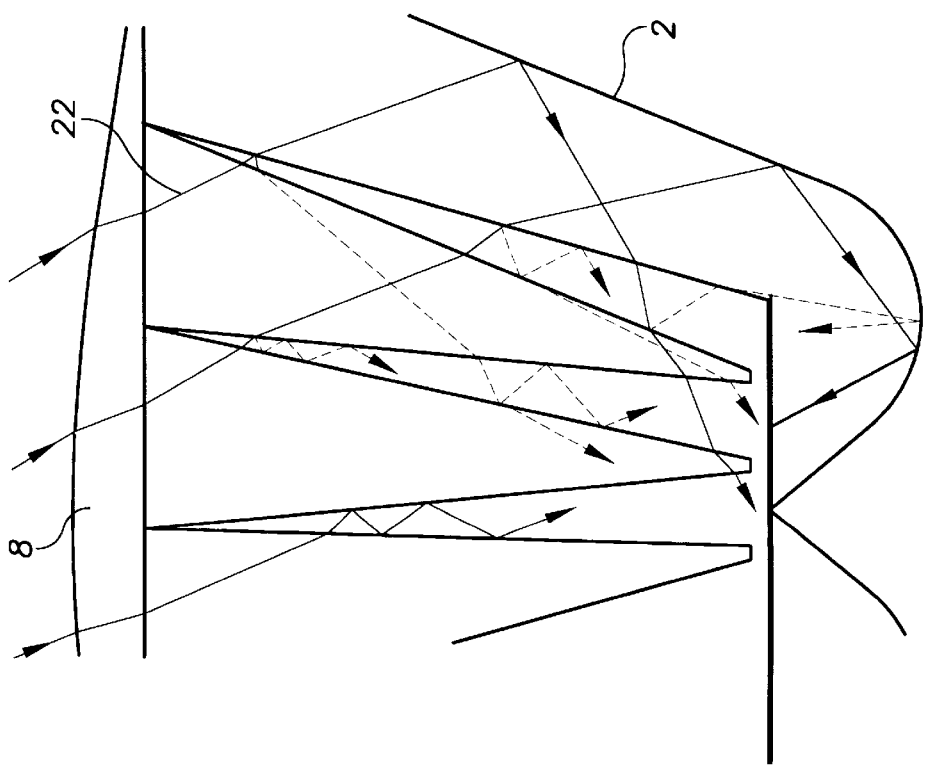
FIG. 19 exemplifies light paths through a device according to the present invention.

Referring now to FIGS. 6 and 17, a transparent filler 10 may be disposed between adjacent prisms in combination with, or as an alternative to, using a cover member. The filler 10 is made from a material having a low index of redaction such as glass. The exterior surface of the filler is coated with a reflective material as opposed to the interior surface of the housing side walls. The filler minimizes breakage or cracking of the prisms and provides stability and structural integrity to the device. In addition, a second filler 12 may be disposed between adjacent housings to form a unitary device from a plurality of adjacent light collection devices according to the present invention.

Figure 10:
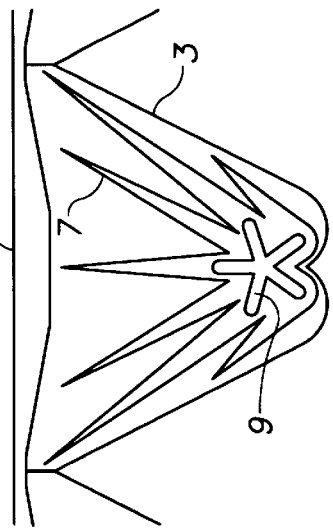
FIG. 10 is yet another embodiment including a star shaped fluid conduit.
Figure 7:
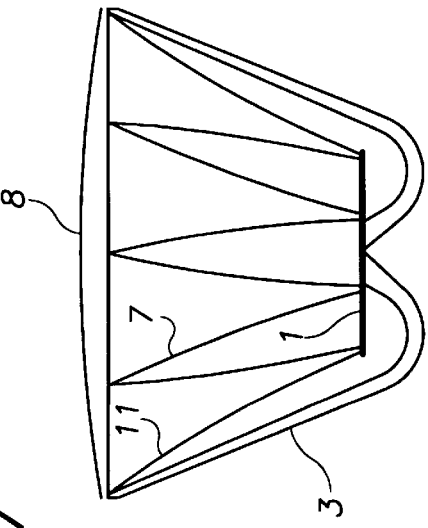
FIG. 7 is similar to the embodiment depicted in FIG. 4 in which the prisms have convex exterior surfaces.
Figure 9:
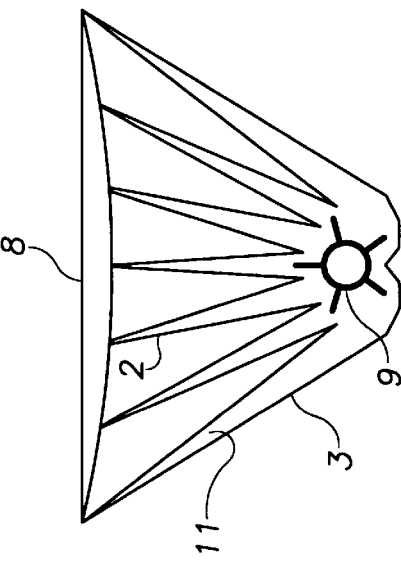
FIG. 9 is an embodiment including an interiorly disposed fluid conduit having collector plates extending therefrom.
Figure 13:
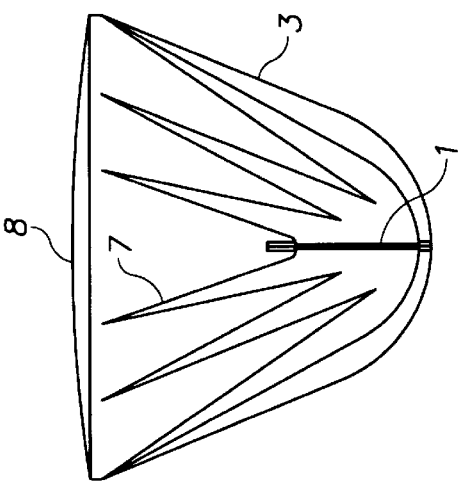
FIG. 13 depicts the embodiment in FIG. 3 whereby the prisms extend from the upper surface of the collector plate.
Figure 14:
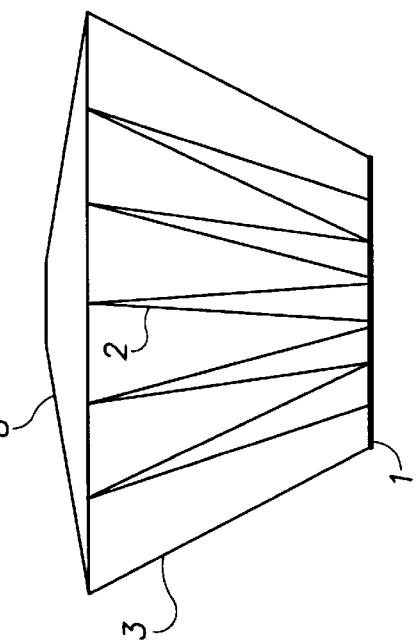
FIG. 14 relates to an embodiment similar to that in FIG. 5 in which the prisms extend from the upper surface of the collector plate and the cover member has a substantially triangular cross-sectional configuration.
Figure 16:
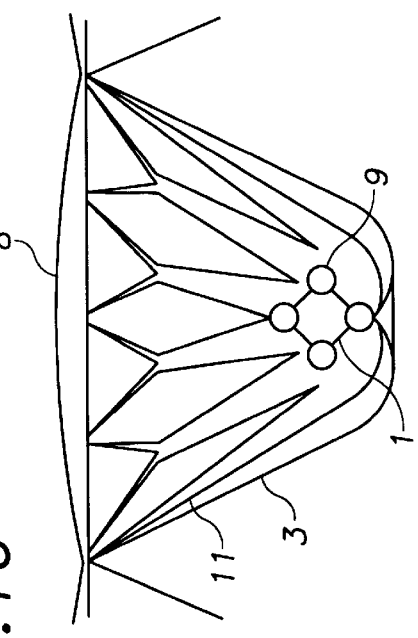
FIG. 16 depicts an embodiment having a lattice type prism with a multiple conduits.
Figure 18:
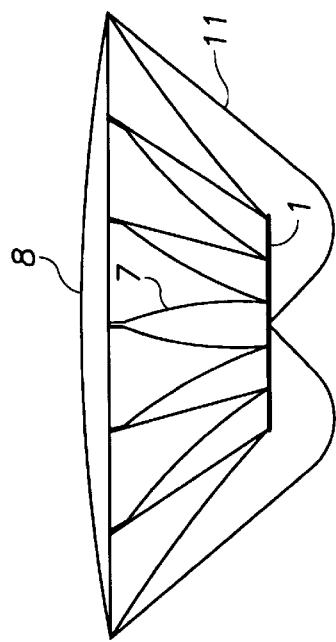
FIG. 18 depicts an embodiment that accommodates a narrower range of sunlight but requires less material.
Figure 15:
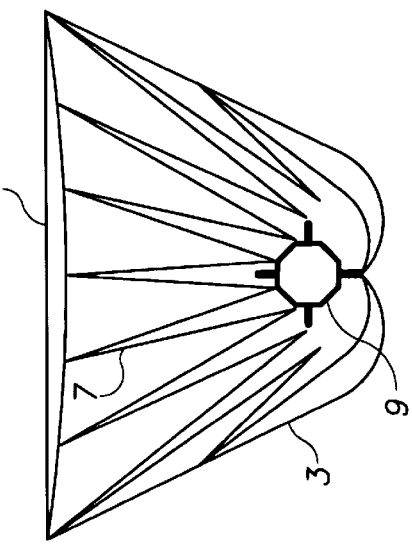
FIG. 15 depicts an embodiment having a hexagonal conduit with collector plates radially extending therefrom.

As mentioned above, the light absorbing means may relate to a photovoltaic cell collector plate in which the prisms extend from the upper surface thereof as depicted in FIGS. 2, 13, 14. Alternatively, the collector plate may be embedded within a lower portion of the prisms as depicted in FIGS. 4, 5, 6, 7, 8, 17, and 18. In addition, the light absorbing means may include one or more fluid conduits 9 made from any suitable material as depicted in FIG. 10. The conduits may also include collector plates extending therefrom as depicted in FIGS. 3, 9, 15 and 16 and may be coated with a light absorbing material to further absorb and direct light towards the conduit. The conduits can have any variety of shapes or sizes to suit a particular application.

Figure 8:
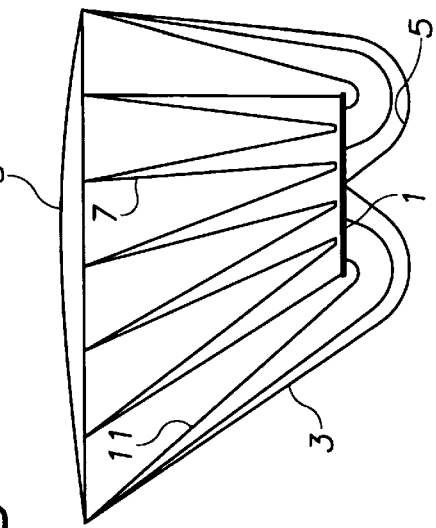
FIG. 8 is another embodiment including laterally directed prisms for attracting and deflecting light projected from a predetermined angle.
Figure 11:
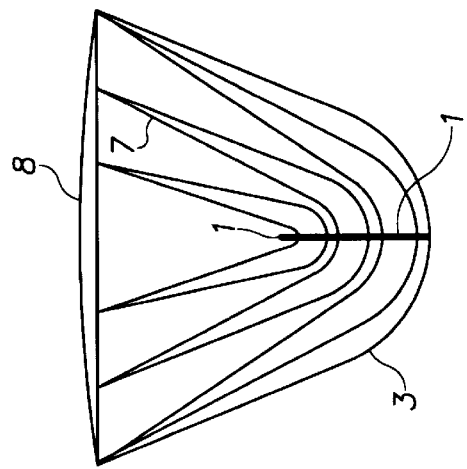
FIG. 11 is an embodiment including a vertical collector plate.
Figure 12:
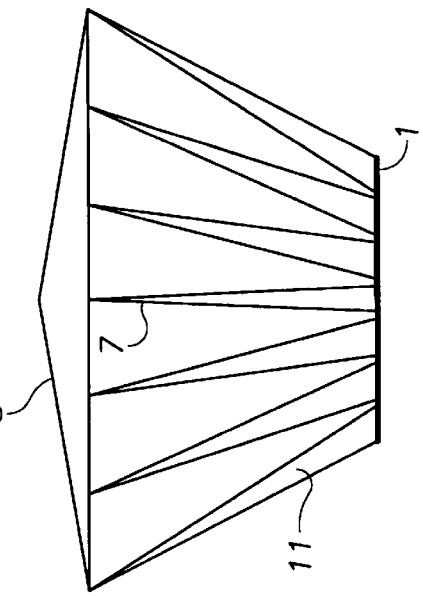
FIG. 12 is an embodiment similar to that in FIG. 11 having a slightly different prism configuration.

Various configurations are possible depending upon he application. For example, the embodiments in FIGS. 5, 9, 14 and 18 may omit the housing. In such case, the exterior surfaces of the outer prisms 11 may be coated with a reflective material to direct the light back towards the remaining prisms. As depicted in FIGS. 11 and 12, the photovoltaic cell collector or light absorbing plate may be vertically disposed within the prism configuration to provide support thereto. Alternatively, the prisms may be directed towards one of the side wails of the housing as depicted in FIG. 8. Such a configuration is particularly suitable for collector plates which must be mounted on a roof, a wall or a similar sloped surface. Furthermore, the device may be configured to direct light towards both the upper and lower surfaces of a collector plate as depicted in FIG. 6 or only to the upper surface as depicted in FIGS. 13 and 14. The device in FIGS. 13 and 14 may include an insulating pad 18 beneath the bottom surface of the collector plate.

Figure 20:
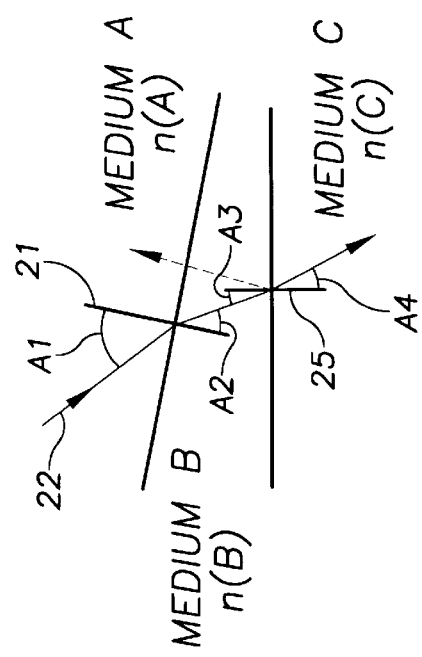
FIG. 20 depicts angles of refraction for a light beam traveling through three media.

Now referring to FIG. 20, the angle of deflection for a given light beam depends upon the index of refraction of the media through which the light is passing. For example, in FIG. 20, $A_1$ represents the angle between a light beam 22 approaching a transparent medium B, such as a prism or the cover member, from a first medium A, i.e. the atmosphere, and an imaginary line 21 normal to the surface of the medium B where the light beam initially enters. $A_2$ represents the angle between the line 21 and the light beam 22 as it passes through the medium B. $A_3$ represents the angle between the light beam 22 within the transparent medium B and an imaginary line 25 normal to the surface of medium B where the light passes to a third medium C, such as the atmosphere or the filler. $A_4$ represents the angle between the line 25 and the resulting, refracted light beam as it travels through medium C. Accordingly, the various angles of refraction are calculated as follows, with n being the index of refraction of a corresponding transparent medium:

$$\text{Sin } A_2 = \text{Sin } A_1 \times n(A)/n(B)$$

$$\text{Sin } A_4 = \text{Sin } A_3 \times n(B)/n(C)$$

For example, crown glass has an index of refraction of 1.5, flint glass has an index of 1.75 while heavy flint glass has an index of 1.9. However, as will be readily apparent to those skilled in the art, other materials may be selected according to their indices of refraction so as to achieve desired angles of refraction.

The above described device is not to be limited to the exact details of construction enumerated above. Although specific configurations of prisms, housings, cover members, fillers, collector plates and conduits have been shown and described, the light collection system according to the present invention may have various configurations and designs. Furthermore, the size, shape and materials of construction may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A light refracting and collecting assembly comprising:

a housing having a bottom surface, diverging side walls extending therefrom, two end walls disposed between said side walls and an open top in communication with an interior portion, said bottom surface and said side walls having an interior surface;

a light absorbing means disposed within said interior portion for absorbing and transferring light to a solar operated device;

a light refracting means disposed within said interior portion for refracting light downwardly towards the bottom surface of said housing, said light refracting means including a plurality of spaced, radially extending prisms each attached to said light absorbing means, said prisms having a predetermined shape and thickness.

2. A device according to claim 1 wherein said light absorbing means is a light collector plate in communication with a photovoltaic cell for converting energy emanating from light to an electrical current.

3. A device according to claim 1 wherein said light absorbing means is a conduit for receiving fluid.

4. A device according to claim 1 wherein said light absorbing means is a conduit having a plurality of light collector plates extending therefrom.

5. A device according to claim 1 further comprising:
   a transparent cover member overlaying the open top of said housing, said cover member having a predetermined configuration to refract light towards the interior portion of said housing.

6. A device according to claim 5 wherein said bottom surface is formed of at least one arcuate portion for reflecting light towards said light absorbing means.

7. A device according to claim 6 wherein the interior surface of said housing side walls and said housing bottom surface are coated with a light reflective material.

8. A device according to claim 7 wherein said conduit is coated with a light absorbing material.

9. A device according to claim 1 wherein said light absorbing means is embedded within said prisms.

10. A device according to claim 9 further comprising a transparent filler disposed between adjacent prisms and between each of two outermost prisms and an adjacent housing side wall thereby providing structural integrity to the prisms.

11. A device according to claim 10 wherein said filler is constructed with a substantially non-refractive material.

12. A device according to claim 11 wherein said filler is constructed with glass.

13. A device according to claim 10 wherein said collector plate is vertically disposed within said housing interior portion.

14. A device according to claim 11 wherein said collector plate is horizontally disposed within said housing interior portion.

15. A device according to claim 5 wherein said cover member includes a convex upper surface to bend light rays passing therethrough towards a central portion of the housing.

16. A device according to claim 1 further comprising a transparent, substantially non-refractive filler disposed between and attached to adjacent housings to form a unitary collection device from a plurality of collection devices.

17. A device according to claim 12 wherein said filler includes an exterior surface having a reflective coating thereon to reflect light towards said prisms.

18. A light refracting and collecting assembly comprising:
   a light absorbing means in communication with an external, solar operated device;
   a plurality of prisms radially extending from the light absorbing means, including a pair of opposing, outermost prisms, each having an outer surface with a reflective material thereon whereby light contacting said prisms is directed towards said light absorbing means.

* * * * *